United States Patent [19]

Vargo

[11] Patent Number: 5,087,483
[45] Date of Patent: Feb. 11, 1992

[54] CARBURIZING CERAMIC PLATES FOR A FAUCET VALVE

[75] Inventor: Edward J. Vargo, Lincoln Park, Mich.

[73] Assignee: Masco Corporation, Taylor, Mich.

[21] Appl. No.: 497,781

[22] Filed: Mar. 21, 1990

Related U.S. Application Data

[63] Continuation-in-part of Ser. No. 274,876, Nov. 22, 1988.

[51] Int. Cl.$^5$ .......................... B05D 7/22; C23C 16/00
[52] U.S. Cl. .................................... 427/235; 427/237; 427/249
[58] Field of Search .................. 251/368; 137/625.4, 137/625.41; 264/29.5, 62; 427/249, 255, 235, 237

[56] References Cited

U.S. PATENT DOCUMENTS

| | | | |
|---|---|---|---|
| 4,110,386 | 8/1978 | Yajima et al. | 264/29.5 |
| 4,267,211 | 5/1981 | Yajima et al. | 264/29.5 X |
| 4,303,137 | 12/1981 | Fischer | 175/374 |
| 4,334,552 | 6/1982 | Blanchard | 251/368 X |
| 4,420,142 | 12/1983 | Dworak et al. | 137/625.41 X |
| 4,690,617 | 9/1987 | Oda et al. | 416/241 B |
| 4,966,789 | 10/1990 | Knapp et al. | 427/248.1 |

FOREIGN PATENT DOCUMENTS

PCT/JP86/0-
0125  3/1986 PCT Int'l Appl. .

Primary Examiner—James Lowe
Assistant Examiner—Christopher A. Fiorilla
Attorney, Agent, or Firm—Edgar A. Zarins; Malcolm L. Sutherland

[57] ABSTRACT

A method of impregnating the surface of a ceramic disk for use in a faucet valve to fill the pores of the ceramic plate and reduce the coefficient of friction between cooperating plates which control the fluid flow through the faucet valve. The plates are impregnated by subjecting the plates to a carburizing gas under heat over an extended period of time. The process causes a carbon matrix to fill the pores of the ceramic plate. Thereafter, the plates are lapped and polished to remove any excess deposits from the plate surface. The process forms a pair of cooperating plates for use in a faucet valve which eliminate sticking or lock-up of the valve assembly.

13 Claims, No Drawings

CARBURIZING CERAMIC PLATES FOR A FAUCET VALVE

This is a continuation-in-part of copending application Ser. No. 07/274,876 filed Nov. 22, 1988, now abandoned.

BACKGROUND OF THE INVENTION

II. Field of the Invention

This invention relates to valve plates for a faucet assembly which reduce sticking and lock-up of the valve and, in particular, to a process of manufacturing such valve plates by impregnating the porous surface of the plates with a carbon matrix by subjecting the plates to a carburizing gas.

II. Description of the Prior Art

Modern faucet valves utilize cooperating ceramic plates to control the fluid flow through the valve. The flow is interrupted or controlled by moving one of the ceramic plates with respect to the other to selectively open a fluid flow path. The plates are preferably made of ceramic to withstand the erosive environment of the flowing water. The plates can take many forms with openings of different configurations to reduce flow noise while optimizing fluid flow. The cooperating surfaces of the plates are polished to a smooth finish to facilitate relative movement. However, the smooth finish also causes the cooperating surfaces to adhere resulting in "sticking" of the valve which reduces performance. In an attempt to eliminate sticking a lubricant can be provided between the plates. Eventually, however, the lubricant is washed or worked from between the plates reducing the performance of the valve and faucet.

SUMMARY OF THE PRESENT INVENTION

The present invention overcomes the disadvantages of the prior art by providing a carburized ceramic plate for a faucet valve which retains the wear-resistant properties of ceramic plates while eliminating sticking and lock-up resulting from depletion of the lubricant.

The present invention is directed to the manufacture of flow controlling plates for a faucet valve which utilize a ceramic base for strength and a carburizing pack to impregnate the surface of the plates. The flow control members are normally utilized in pairs in adjoining cooperation to control the fluid flow. Although numerous cooperating configurations are contemplated, the simplest flow control members are a pair of cooperating disk-like plates. The plates include flat surfaces in adjoining sliding contact to form a seal which selectively closes the flow path. One of the plates may have apertures or notches which are selectively covered and uncovered by the movement of one plate relative to the other to control fluid flow. The valving members are made of ceramic to retard erosion of the members and particularly any flow openings. Normally, a lubricant would be added between the cooperating surfaces of the plates. However, the valving members of the present invention are carburized to impregnate the pores of the ceramic plates thereby reducing the coefficient of friction between the cooperating valving members. The impregnated carbon material will not wash away or otherwise be depleted from between the plates thereby maintaining the friction coefficient.

The valving plates are manufactured so as to impregnate the surface porosity with a carbon material to reduce the coefficient of friction. The valving members are first formed and ground to the desired configuration including any flow openings. The cooperating surfaces of the valving members should be ground and polished to a smooth finish to provide sealing cooperation and smooth movement between the plates. Thereafter, the valving members are subjected to a carburizing gas which penetrates and fills the surface pores of the plates. Following carburization the normally white ceramic plates will have non-uniform black spots which represents the impregnated pores. Final relapping or polishing can be conducted to eliminate any areas where carbon deposits have built up beyond the surface of the valving members.

Other objects, features, and advantages of the invention will be apparent from the following detailed description.

DETAILED DESCRIPTION OF A PREFERRED EMBODIMENT OF THE PRESENT INVENTION

The present invention is directed to a process for manufacturing flow control members for a faucet valve assembly. The flow control members may be in the form of plates, disks, concave or semispherical members, or spherical members and are normally used in adjoining cooperation to control the fluid flow through the valve and therefore the faucet. In order to simplify description of the process and the flow control members themselves, the invention will be described in conjunction with flat plate members. The plate members are used in pairs in adjoining cooperation with one of the members fixed within the faucet valve and the other slidably movable relative to the first plate. The plates preferably include smooth flat surfaces which cooperate to selectively prevent fluid flow through the valve. One of the plate members may be provided with notches or openings which communicate with the fluid source. As the movable plate uncovers the openings fluid will flow into the valve and through the faucet. By providing two openings in the plate the valve will mix hot and cold water. A single opening plate is utilized in dual handle faucets.

Because of the erosive environment within which the valving plates operate, the plates are preferably constructed of a wear-resistant hard material such as ceramic. Ceramics are resistant to damage from the fluid flow past or through the plates or from particulates in the water. Ceramic materials also can be molded and ground into intricate configurations for use in the faucet valve. Finally, when polished smooth, the cooperating surfaces of a pair of valve seals made of ceramic sealingly engage to prevent fluid flow through the valve except as intended. However, it is this cooperating sealing action which can cause the plates to stick or lock-up to each other affecting the performance of the valve and faucet. Lubricants have been added between the plates with limited success.

The process of the present invention forms a carburized plate member which is essentially "self-lubricated" eliminating the need for any added lubricant while retaining the favorable properties of the ceramic plates. A base is first formed of a ceramic material into a configuration which is substantially similar to the desired configuration of the finished plate. The base form may be ground and/or polished to provide a smooth finish particularly on the cooperating surfaces of the plate members. However, such finishing may be delayed until final finishing. Once the configuration of the base form is developed, the base can be subjected to the carburizing process.

The base is carburized by subjecting the base form to a carburizing gas at an elevated temperature for an extended period of time. In a preferred process, the base form is subjected to the carburizing gas at a temperature of between 1700 and 2100 degrees Fahrenheit for a period of from four to twenty hours. The length of time can be varied in accordance with the temperature at which the ceramic base form is carburized. Subjecting the base form to 1900 degrees Fahrenheit for fourteen hours has been found to provide exceptional results. Thereafter, the base form is cooled to room temperature prior to further processing.

The carburizing process impregnates the surface pores of the ceramic base with a carbon deposit in order to reduce the friction coefficient of the plates. It has been found that the pores are penetrated approximately 0.005 to 0.150 inches by the carburizing process. The carbon deposits create non-uniform spots of black on the normally white ceramic plates. The remainder of the surface has become grey indicating heavier deposits in some areas of the ceramic plates than others. The carburizing gas is created by using a carburizing pack compound capable of generating carbon potentials of from 0.90% to 1.20% carbon. This carbon potential can also be generated by an alcohol/nitrogen compound or an endothermic generator. Such a gas is suitable to penetrate the surface pores of the ceramic plate and filling the pores with carbon deposits. A typical carburizing compound contains a mixture of approximately 10-20% alkali or other metal carbonates bound to hardwood, charcoal, or coke by tar, oil or molasses. During the carburizing process, carbon monoxide derived from the solid compound decomposes at the surface of the plate into nascent carbon and carbon dioxide, the nascent carbon being absorbed into the ceramic material. The carbon dioxide reacts with the carbonaceous material present in the solid carburizing compound to produce fresh carbon monoxide. This reaction is enhanced by energizers or catalysts in the carburizing compound, such as barium carbonate or sodium carbonate, which reacts with the carbon to form additional carbon monoxide and an oxide of the energizing compound. The latter reacts in part with the carbon dioxide to reform the carbonate. Thus, in a closed system, the energizer is continuously being used and reformed while carburizing continues as long as sufficient carbon is present to react with the excess carbon dioxide.

Once the carburizing process is complete, the surface of the plates can be lapped, ground or polished to eliminate any excess carbon deposits which would affect the operating of the plates while also polishing the surface to provide a permanent lubrication between the plates thereby facilitating relative movement between plates. The finished plate members therefore include a ceramic base form having a carburizing compound impregnated into the surface pores of the ceramic base to provide a non-depletable lubrication between plates. The plates may be configured into any desirable shape and may include notches or openings to control fluid flow through the faucet valve.

The foregoing detailed description has been given for clearness of understanding only and no unnecessary limitations should be understood therefrom as some modifications will be obvious to those skilled in the art without departing from the scope and spirit of the appended claims.

I claim:

1. A process of manufacturing a flow control member for a faucet valve, a pair of flow control members having mutually cooperating surfaces positioned in adjoining cooperation to selectively control the fluid flow through the faucet valve, the process comprising the steps of:

forming the base configuration of the flow control member from a ceramic material, said base form having surface pores therein;

subjecting said base form to a carburizing gas at an elevated temperature to impregnate the surface pores of said base form with carbon deposits thereby forming a carburized base form; and finishing said carburized base form to remove excess surface deposits which have built up beyond the surface of the base form and provide the cooperating surface of the flow control member with a smooth finish.

2. A process as defined in claim 1 wherein said base form is subjected to a carburizing gas generated by a carburizing pack compound having carbon content of between 0.90% and 1.20% carbon.

3. The process as defined in claim 2 wherein said base form is subjected to said carburizing gas at an elevated temperature of between 1700 degrees Fahrenheit and 2100 degrees Fahrenheit.

4. The process as defined in claim 3 wherein said base form is subjected to said carburizing gas at an elevated temperature of 1900 degrees Fahrenheit.

5. The process as defined in claim 3 wherein said base form is subjected to said carburizing gas at said elevated temperature for a time period of between four and twenty hours.

6. The process as defined in claim 5 wherein said base form is subjected to said carburizing gas at said elevated temperature for a time period of fourteen hours.

7. The process as defined in claim 5 wherein said carburized base form is cooled to room temperature before finishing.

8. The process as defined in claim 1 and further comprising the step of preliminarily finishing said base form to a smooth finish before subjecting said base form to said carburizing gas.

9. A process of manufacturing a flow control member for a faucet valve, a pair of flow control members positioned in adjoining cooperation to selectively control the fluid flow past the flow control members and through the faucet valve, the process comprising the steps of:

forming the base configuration of the flow control member from a ceramic material, said ceramic base form having a plurality of surface pores;

lapping said base form to form a smooth cooperating surface capable of sealing cooperation with a second flow control member;

subjecting said base form to a carburizing gas at a temperature of between 1700 degrees Fahrenheit and 2100 degrees Fahrenheit for a time period of between three hours and five hours to impregnate the surface pores of said base form with carbon deposits; and finishing said carburized base form to remove excess surface deposits and provide the cooperating surface of the flow control member with a smooth final finish to facilitate sealing sliding cooperating with said second flow control member.

10. The process as defined in claim 9 wherein said carburizing gas is generated by a carburizing pack compound capable of generating carbon potentials of between 0.009 and 0.012 carbon.

11. The process as defined in claim 10 wherein said base form is subjected to said carburizing gas at a temperature of 1900 degrees Fahrenheit.

12. The process of defined in claim 11 wherein said base form is subjected to said carburizing gas at said elevated temperature for a time period of four hours.

13. The process as defined in claim 9 wherein said carburized base form is cooled to room temperature before finishing.

* * * * *